Aug. 25, 1970  A. D. COPE  3,525,806
ELECTRONIC SHUTTER
Filed Aug. 31, 1967

INVENTOR.
APPLETON D. COPE
BY
Henry S. Miller Jr
AGENT

United States Patent Office 3,525,806
Patented Aug. 25, 1970

3,525,806
ELECTRONIC SHUTTER
Appleton D. Cope, Hightstown, N.J., assignor, by mesne assignments, to the United States of America as represented by the Secretary of the Air Force
Filed Aug. 31, 1967, Ser. No. 665,686
Int. Cl. H04n 5/26
U.S. Cl. 178—7.2                          2 Claims

ABSTRACT OF THE DISCLOSURE

A technique for extracting the signal from a storage vidicon or image storage tape by electronically controlling the optical exposure to thereby eliminate the need for a mechanical shutter. The technique consists of first flooding the photoconductor with light until the layer is saturated with photo-excited carriers; then applying an electric field across the photoconductor and simultaneously removing the flood illumination and exposing the photoconductor to the image and finally removing the electric field to terminate the exposure interval.

This invention relates generally to an electronic shutter and more specifically to a method for the electronic shutter operation of a storage vidicon or electrostatic storage tape.

The ordinary process of information storage by means of a storage vidicon is with image illumination falling continuously on the photosurface and with the exposure duration being controlled by the time interval during which an electric field is applied across the storage layer. A phototape, such as that used in a television phototape system, operates in a series of shutter controlled optical exposures. In order to increase the sensitivity, resolution, and speed of an information storage system it has been found in many cases expedient to use a shutter system with the storage vidicon tube. However, where an ordinary mechanical shutter has been tried it has been found that the storage speed is substantially limited and could not even approach the millimicrosecond range.

It is therefore a purpose of this invention to provide an electronic shutter which may be utilized in conjunction with either a storage vidicon or an electrostatic image storage tape.

It is another object of this invention to provide a new and improved electrostatic image storage medium for high speed information storage and retrieval.

It is a further object of this invention to provide a new and improved method of operating an electronic shutter in an information storage system.

It is still another object of this invention to provide an electrostatic image storage medium which is economical to produce and utilizes conventional, currently available components that lend themselves to standard mass production manufacturing techniques.

Figure 1:
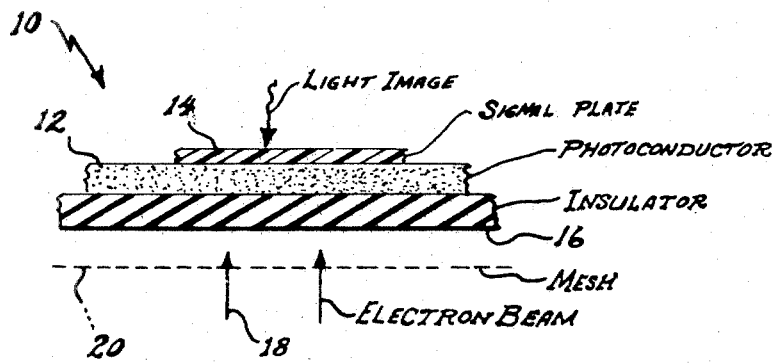
Figure 2:
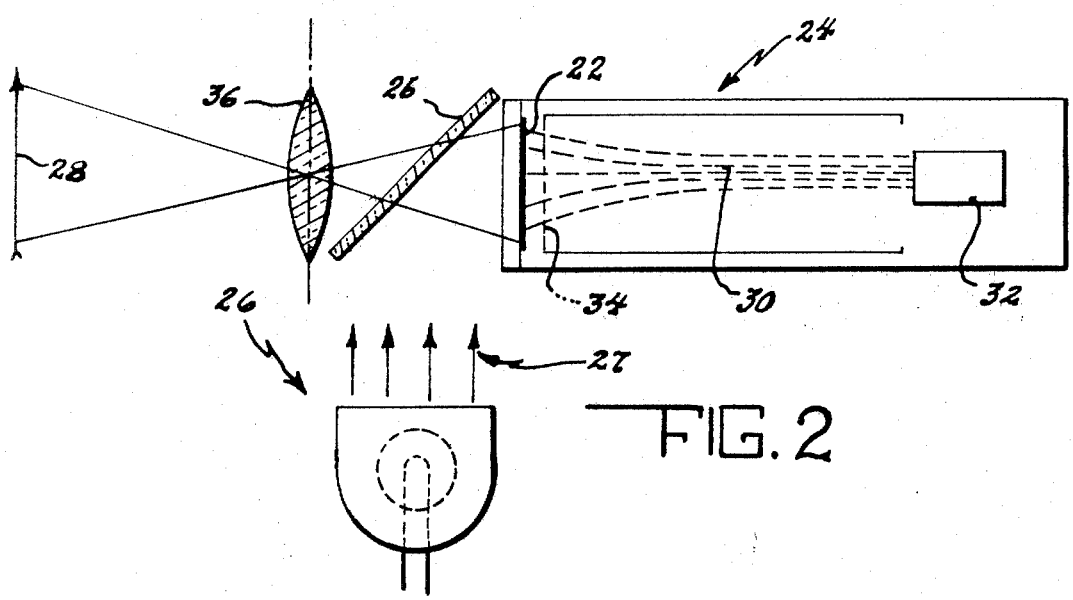

These and other advantages, features, and objects of the invention will become more apparent from the following description taken in conjunction with the illustrative embodiments in the accompanying drawing wherein:

FIG. 1 is a cross-sectional representation of the electrostatic image storage tape used in accordance with this invention; and FIG. 2 is a schematic representation of the electronic shutter system used with a vidicon storage tube included in this invention.

Referring now in more detail to FIG. 1, there is shown a phototape electrostatic image storage medium generally at 10. The storage medium consists of a photoconductor layer 12 positioned between an electroded layer 14 which is also a transparent substrate, and an insulator layer 16. The photoconductor insulator combination is designated a double layer. An electron beam 18 strikes the exposed surface of the insulator setting up an electric field across the storage medium. A mesh or grid 20 collects secondary carriers as will be explained hereinafter. The light image strikes the photoconductor through the signal plate or electroded layer 14 causing photo carriers to flow and creates a modulation of the potential of the interface between the photoconductor 14 and the insulator 16.

The purpose of this construction is to utilize photoconduction to modulate the potential of the interface between the two layers in order that an analog of the incident light image is stored on the insulator in the form of an electrostatic charge image.

Heretofore the optical exposure has been controlled by a mechanical shutter which interrupts the incident light allowing the photoconductor to be in the dark condition; that is, having no light excited free carriers present.

In FIG. 2 the electrostatic image storage medium described in detail in FIG. 1 is mounted at 22 as the photosensor and storage element of a storage vidicon tube generally shown at 24 and used in an electronic shuttering system. A partially reflecting mirror 26 is inclined at an appropriate angle to reflect light 27 from the strobatic discharge lamp 26 which floods the storage medium 22 continuously with light of sufficient intensity to uniformly saturate the photoconductor layer with photo-excited carriers. The image 28 may, or may not, be incident on the photoconductor at this time. An electric field is applied across the photoconductor insulator sandwich by means of the electron beam 30 emanating from the electron source 32. The electron beam may provide either a flood of electrons or alternatively move across the insulator in a scanning fashion. The grid or mesh 34 effectively collects and removes any secondary electrons from the insulator in the storage medium.

Simultaneously with the application of the field the flood of illumination from lamp 26 is removed and the image 28 alone illuminates the photoconductor. The scene will usually be seen through an optical system represented by the lens which focuses the image through the partially reflecting mirror 26.

During the exposure interval the initial high transport charge in the photoconductor is decreasing at different rates according to the image illumination; dark areas decreasing more rapidly than illuminated areas.

The electric field is subsequently removed from the storage medium to terminate the exposure interval at a time when there is a maximum difference in charge transported to the interface in regions of varying illumination. In this method the modulation of the potential of the interface occurs through a drop in photoconduction. During the exposure interval the photoconduction is decreasing from a saturated equilibrium. Without the flood illumination an exposure interval controlled only by the beam applying and removing the electric field is subject to remnants of photo-excitation which occurs in the prior interval of time. This is a result of a finite time for decay of photo-excitation to the dark level. Flood illumination which saturates the photo-conductor wipes out all lag carry over and hence images are not blurred by other than the motion occurring during the exposure interval.

Although the invention has been described with reference to particular embodiments, it will be understood to those skilled in the art that the invention is capable of a variety of alternative embodiments within the spirit and scope of the appended claims.

I claim:
1. A method of operating an electronic shutter comprising the steps of: continuously flooding a photoconductor with light of sufficient intensity to uniformly satu- rate it with photo-excited carriers; applying an electric field across a laminated photoconductor-insulator structure, having a contiguous interface and simultaneously removing the flooding light, exposing the photoconductor to an illumiated image through a light transmitting electrode whereby varying quantities of charge are transported in regions receiving varying illumination to the interface between the photoconductor and insulator, the duration of said charge transport being limited to the length of time said electric field is applied.

2. An electronic shutter system comprising: a storage vidicon tube having an image storage area, said storage area comprising an insulated layer, a light sensitive photoconductive layer and a light passing electrode layer in juxtaposition across the face of the tube; a strobatic discharge lamp; a partially reflecting mirror positioned to direct a flood of light from the lamp to the image storage area for exciting photo carriers in the photoconductive layer, an optical lens means for focusing an image through the mirror on to the image storage area and means for applying and removing an electric field to the image storage area of the storage tube in cooperation with the discharge lamp whereby the storage tube will only receive the image while the electric field is applied after the storage area has been flooded with light.

References Cited

UNITED STATES PATENTS 2,619,531    11/1952    Weighton    178—7.2
3,431,460    3/1969    Webb    178—7.2

RICHARD MURRAY, Primary Examiner

A. H. EDDLEMAN, Assistant Examiner